United States Patent
Klopper

(10) Patent No.: US 10,197,468 B2
(45) Date of Patent: Feb. 5, 2019

(54) SYSTEM AND METHOD FOR DETERMINING INERTIA PROPERTIES OF A RIGID BODY

(75) Inventor: Robert Klopper, Berlin (DE)

(73) Assignee: RESONIC GMBH, Berlin (DE)

( * ) Notice: Subject to any disclaimer, the term of this patent is extended or adjusted under 35 U.S.C. 154(b) by 327 days.

(21) Appl. No.: 14/122,248

(22) PCT Filed: May 17, 2012

(86) PCT No.: PCT/EP2012/059219
§ 371 (c)(1),
(2), (4) Date: Nov. 26, 2013

(87) PCT Pub. No.: WO2012/163688
PCT Pub. Date: Dec. 6, 2012

(65) Prior Publication Data
US 2014/0088914 A1   Mar. 27, 2014

(30) Foreign Application Priority Data
May 31, 2011 (EP) ..................................... 11168278

(51) Int. Cl.
*G01M 1/10* (2006.01)
*G06F 17/11* (2006.01)

(52) U.S. Cl.
CPC ............... *G01M 1/10* (2013.01); *G06F 17/11* (2013.01)

(58) Field of Classification Search
CPC ......... G01M 1/10; G01C 21/16; G01C 19/02; A61B 2562/0219; A61B 2560/0223; G01P 15/18; G01P 15/097; F16F 15/02
(Continued)

(56) References Cited

U.S. PATENT DOCUMENTS 5,309,753 A * 5/1994 Johnson ................. A63B 60/42
                                                             73/65.01
5,460,099 A * 10/1995 Matsuhisa ............... B61B 12/04
                                                              104/115
(Continued)

FOREIGN PATENT DOCUMENTS

JP   S54157684   12/1979
JP   H11326026   11/1999
(Continued)

OTHER PUBLICATIONS

Nakazono et al., "Improved Rigid Body Property Identification of Low-rigidity Structures by means of a Multi-wire Suspension Model," No. 115, Dynamics and Design Conference 2010, 2010. 9:14-18.
(Continued)

*Primary Examiner* — Roy Y Yi
*Assistant Examiner* — Jeffrey Aiello
(74) *Attorney, Agent, or Firm* — JMB Davis Ben-David

(57) ABSTRACT

System for determining inertia properties of a rigid body, particularly the inertia tensor, the mass and/or the position of the center of mass, comprising: a carrier (10), which is designed for suspending a rigid body (2) from the carrier (10), such that the rigid body (2) is able to perform movements along the six degrees of freedom of the rigid body (B), at least six sensors (100) providing output signals for detecting the movement of the rigid body (2) along the six degrees of freedom of the rigid body (2), a measuring device (110) cooperating with the sensors (100), wherein the measuring device (110) is configured to measure said movement of the rigid body (2) by means of said output signals ($š_1(t_k)$), and an analyzing means (20) configured for determining from said output signals ($š_1(t_k)$) said inertia properties ($r_S$).

(Continued)

Furthermore, the invention relates to a method for determining the inertia properties ($r_S$).

6 Claims, 3 Drawing Sheets

(58) Field of Classification Search
USPC ....... 73/382 G, 282 R, 65.01, 65.07, 504.01, 73/504.12; 703/41, 141, 142, 169; 700/245; 702/141, 153
See application file for complete search history.

(56) References Cited

U.S. PATENT DOCUMENTS

| | | | | |
|---|---|---|---|---|
| 5,931,441 | A * | 8/1999 | Sakamoto | F16F 15/02 248/550 |
| 6,036,162 | A * | 3/2000 | Hayashi | F16F 15/00 248/550 |
| 6,338,274 | B1 * | 1/2002 | Carroll | G01P 15/08 73/514.15 |
| RE39,906 | E * | 11/2007 | Roston | F16F 15/00 318/561 |
| 7,630,869 | B2 * | 12/2009 | Shen | G01H 1/003 703/13 |
| 2003/0029238 | A1 * | 2/2003 | Challoner | G01C 19/5719 73/504.04 |
| 2004/0164253 | A1 * | 8/2004 | Ito | F16F 7/1011 250/491.1 |
| 2006/0010965 | A1 * | 1/2006 | Mastinu | G01M 1/10 73/65.07 |
| 2006/0288779 | A1 * | 12/2006 | Cardarelli | G01C 19/5719 73/504.02 |
| 2010/0030532 | A1 * | 2/2010 | Arora | G06T 13/40 703/2 |
| 2010/0135594 | A1 * | 6/2010 | Allebach | G06T 5/003 382/275 |
| 2010/0230370 | A1 * | 9/2010 | Schneider | B63B 27/10 212/276 |
| 2012/0089375 | A1 * | 4/2012 | Kordt | G05B 13/04 703/1 |
| 2013/0206916 | A1 * | 8/2013 | Kordt | B64C 9/34 244/203 |
| 2014/0208848 | A1 * | 7/2014 | Krylov | B81B 3/0048 73/504.12 |

FOREIGN PATENT DOCUMENTS

| | | |
|---|---|---|
| JP | 2011089958 | 5/2011 |
| WO | 2012005114 | 1/2012 |

OTHER PUBLICATIONS

Akita et al, "Development of a Highly Accurate Rigid Body Property Identification System," No. 114, Dynamics and Design Conference 2010, 2010. 9:14-18.

Pandit et al., "Determination of Rigid Body Characteristics from Time Domain Modal Test Data," J. of Sound and Vibration 177:31-41, 1994.

* cited by examiner

SYSTEM AND METHOD FOR DETERMINING INERTIA PROPERTIES OF A RIGID BODY

CROSS-REFERENCE TO RELATED APPLICATIONS

This is the U.S. National Stage of International Application No. PCT/EP2012/059219, filed May 17, 2012, which was published in English under PCT Article 21(2), which in turn claims the benefit of European Patent Application No. 11168278.7, filed May 31, 2011.

The invention relates to a system for determining inertia properties of a rigid body $r_S = \{m, \zeta_G, \theta\}$—also called rigid body properties—, particularly the inertia tensor $\theta$ (moments of inertia), the mass m and/or the position of the center of mass (gravity) $\zeta_G$, as well as to a method for determining said properties of a rigid body.

These rigid body properties are essential in predicting and optimizing the dynamic behaviour of various types of machines. Examples include the prediction of roll-over limits of vehicles, the reduction of engine vibrations through optimal mounts, and the design of optimal actuation and control systems for robot manipulators, aircraft, and satellites.

Therefore, the problem underlying the present invention is to provide for a system and method of the afore-mentioned kind, which allows for determining said inertia properties in a simple, cost effective and accurate manner.

This method is solved by a system having the features of claim 1.

According thereto, the system according to the invention comprises: a carrier which is configured and provided for suspending a rigid body from said carrier, such that the rigid body is able to perform movements along the six degrees of freedom of the rigid body (it is also possible to restrict the movements to a smaller number of degrees of freedom), at least six sensors (or a number of sensors corresponding to the number of degrees of freedom of the rigid body) providing output signals for detecting the movement of the body along the considered degrees of freedom of the rigid body, a measuring device cooperating with the sensors, wherein the measuring device is configured to measure said movement of the body by means of said output signals, and an analysing means cooperating with said measuring device configured for automatically determining from said movement or rather output signals said interia properties.

Particularly, the measuring device stores and eventually displays values of said movement corresponding to the output signals provided by the sensors. The measuring device can be formed by a computer that runs a suitable software that is particularly loaded into the computers memory and comprises an interface for making connection to the sensors, i.e., so that output signals of the sensors can be read out and properly assigned and further proceeded by the software.

Likewise also the analysing means can be formed by said computer and a corresponding software running on said computer, which software may also be used for measuring said movement (motion) of the rigid body.

Preferably, elastic elements or elements providing for a restoring force are designed and provided for suspending the rigid body in a way that (free) vibrations along the six degrees of freedom (or a smaller number of degrees of freedom) of the rigid body result, when the rigid body is excited to move, for instance by pushing it in some direction.

In this respect, the measuring device is preferably configured to measure as said movement output signals of sensors corresponding to the translation of the rigid body, whose intertia properties shall be determined, along the three orthogonal axes as well as the rotations about these axes as a function of time (in case six degrees of freedom are considered). Preferably, the considered time is discretized into a plurality of discrete points in time $t_k$.

In a preferred embodiment, said analysing means is designed and provided to fit said measured output signals $\check{s}_1(t_k)$ to a function in the form of $$s_l(t_k) = A_l \sum_{j=1}^{6} X_j e^{-\zeta_j \omega_j t_k} (a_{2j-1} \sin(\omega_j t_k) + a_{2j} \cos(\omega_j t_k))$$

that corresponds to a theoretical model of the measured movement (sensor output) $\check{s}_1(t_k)$ of the suspended vibrating rigid body. Here, the sum corresponds to the rigid body motion. (Note that in case less than six degrees of freedom are considered, the above equation changes accordingly, i.e., the summation runs from j=1 to the respective number of considered degrees of freedom).

In the above Equation $A_1$ (1 labels the sensors) is a matrix of constants relating the rigid body motion to the measured output signal $\check{s}_1(t_k)$ (corresponding to the sensor output, i.e., the output signals of the sensors) at time step $t_k$, in particular.

Further, particularly, $\omega_j$ denotes the six (j=1, . . . , 6) natural frequencies (eigenfrequencies), and $\zeta_j$ denotes the damping ratio of the j-th rigid body mode in particular. Finally, $a_{2j-1}$ and $a_{2j}$ represent the amplitude and phase of a given mode j, in particular.

In order to determine said inertia properties of the rigid body, the analysing means is preferably designed and provided to minimize an expression in the form of $$\sum_{l=1}^{N_l} \sum_{k=1}^{N_k} (s_l(t_k) - \check{s}_l(t_k))^2$$

with respect to the inertia properties $r_S \in \mathbb{R}^{10}$, the above stated amplitude and phase $\{a_j\} \in \mathbb{R}^{12}$, and the damping ratios $\{\zeta_j\} \in \mathbb{R}^6$, i.e., $r_S$, $a_j$, and $\zeta_j$ are varied in order to minimize said expression. Once the proper minimum is reached $r_S$ equals the actual inertia properties of the suspended rigid body. Here, $N_1$ is the number of sensors, and $N_k$ is the number of considered (measured) time steps $t_k$.

Preferably, the analysing means is particularly configured to conduct said minimisation by means of a non-linear least-squares method.

The system according to the invention preferably comprises elastic elements, which are designed for suspending the rigid body from the carrier, wherein the rigid body is suspended from the carrier via said elastic elements. Preferably, each of the elastic elements extends longitudinally along an associated extension direction.

In particular, these elastic elements are designed as (suspension) wires or (coil) springs or a combination thereof—for instance a coil spring connecting two free end portions in the form of longitudinally (linearly) extending wires.

It is possible to use one, two, three, four, five, six, seven or eight or even more elastic elements for suspending the rigid body.

In a further embodiment of the invention, the system comprises a platform or a similar element that is configured and provided for supporting the rigid body whose inertia properties shall be determined. Then, said elastic elements connect the carrier to the platform on which said rigid body rests, i.e., the rigid body is suspended from the carrier via the platform and the elastic elements.

In order to measure said excited movement of the suspended rigid body, said sensors may be directly attached to the platform or to the carrier or to the rigid body itself. Alternatively each sensor can be made part of an elastic element, so that the sensor is attached to the carrier and the platform (if present) via a portion of the respective elastic element, respectively.

In a further embodiment of the invention, the carrier (also called support or support frame) is essentially designed as a hexahedral framework.

Furthermore, the problem according to the invention is also solved by a method for determining the stated inertia properties of a rigid body (rigid body properties), wherein the system according to the invention is preferably used for conducting the method.

The method according to the invention comprises the steps of: suspending the rigid body from a carrier, forcing the rigid body to perform movements along the six degrees of freedom of the rigid body (or less degrees of freedom, see above), measuring said movement of the rigid body automatically, i.e., particularly by means of some sort of a measuring device (see above) comprising sensors or cooperating with the latters, and determining said rigid body properties from said movement (output signals) automatically, i.e., particularly by means of some sort of an analysing device (see above), wherein particularly the rigid body is suspended such that it performes a movement (motion) in the form of free vibrations when excited, wherein particularly measuring said movement corresponds to measuring output signals of sensors corresponding to the translations of the rigid body along three orthogonal axes and the rotations of the rigid body about these axes as a function of time (in particular as a function of discretized time $t_k$) in case six degrees of freedom are considered.

Preferably, said measured movement (output signals) $\check{s}_l(t_k)$ is fitted to a function of the form $$s_l(t_k) = A_l \sum_{j=1}^{6} X_j e^{-\zeta_j \omega_j t_k} (a_{2j-1}\sin(\omega_j t_k) + a_{2j}\cos(\omega_j t_k))$$

that models the sensor output signals (measured by the measuring device), wherein said rigid body properties are (automatically) determined by (automatically) minimizing an expression in the form of $$\sum_{l=1}^{N_l} \sum_{k=1}^{N_k} (s_l(t_k) - \check{s}_l(t_k))^2$$

with respect to $r_S \in \mathbb{R}^{10}$, $\{a_j\} \in \mathbb{R}^{12}$, $\{\zeta_j\} \in \mathbb{R}^6$, wherein said minimisation is particularly (automatically) conducted by means of a non-linear least-squares method. Here, $N_l$ is the number of sensors, and $N_k$ is the number of considered (measured) time steps $t_k$.

Advantageously, besides measuring said movement of the suspended and vibrating rigid body, merely the following parameters are preferably used for determining the inertia properties of the considered rigid body:

the number ($N_p$) of the elastic elements (p),
the stiffness value of the elastic elements ($k_p$),
the lengths ($l_p$) of the unloaded elastic elements (p),
the attachment locations ($\zeta_{a,p}$) of the elastic elements (p) on the carrier (10), particularly in space-fixed coordinates,
the attachment locations ($\tilde{\zeta}_{b,p}$) of the elastic elements (p) on the platform (30) or the rigid body (S), particularly in body-fixed coordinates,
the orientation of the field of gravity ($\tilde{n}_g$), and
the rigid body properties ($r_p$) of the platform (when present).

It is a remarkable advantage that these parameters remain constant for a given system (carrier and suspended platform) for all measurements.

Further advantages and details of embodiments of the present invention shall be explained in the following with reference to the Figures, wherein FIG. 1 shows a perspective schematical view of a system according to the invention;

where m is the mass, $\zeta_G$ is the location of the center of gravity, and $\Theta$ is the inertia tensor about the center of gravity $$\Theta = \begin{bmatrix} I_{11} & & sym. \\ I_{12} & I_{22} & \\ I_{13} & I_{23} & I_{33} \end{bmatrix}. \quad (2)$$

These ten parameters define a complete model of the structure's (rigid body's) rigid dynamic behavior.

Figure 2:
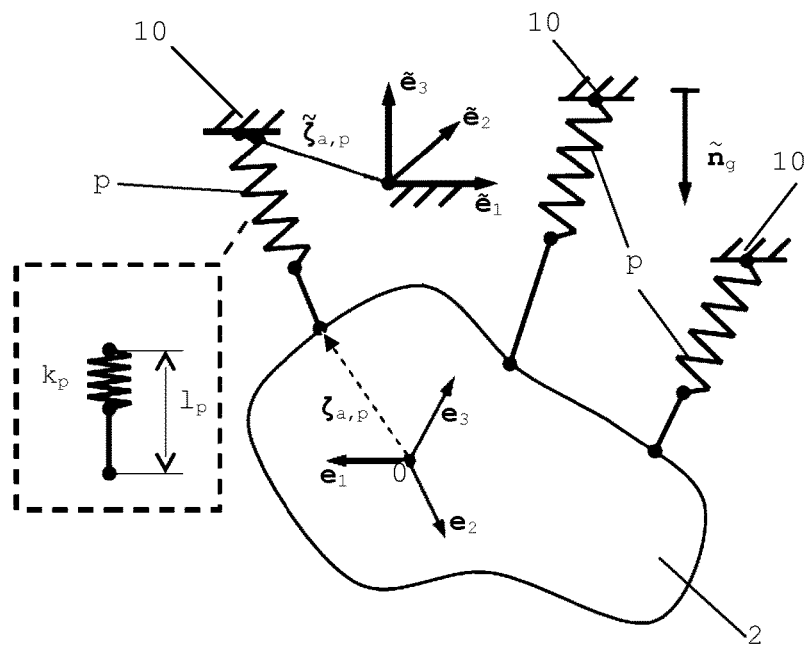
FIG. 2 shows a directly suspended rigid body.
Figure 3:
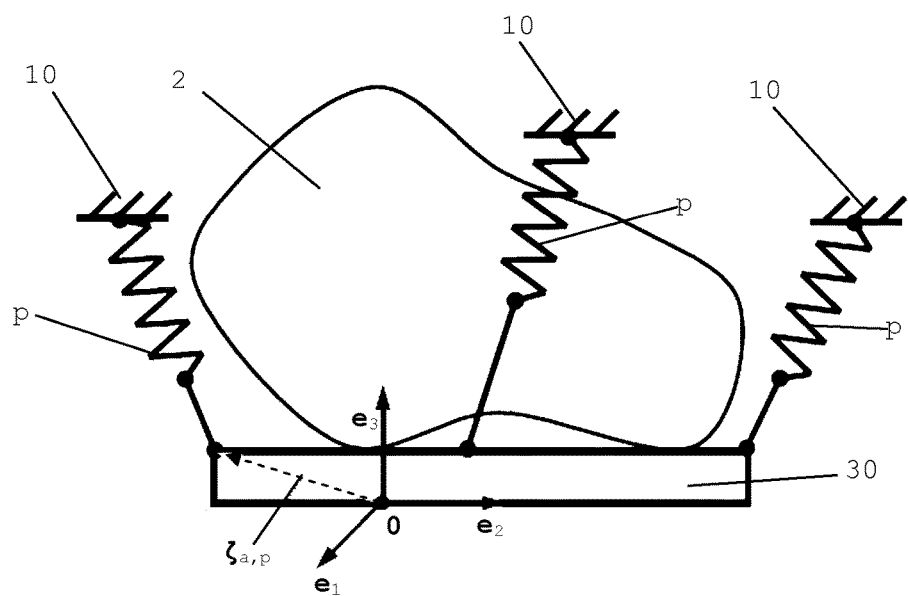
FIG. 3 shows a rigid body being suspended via a platform supporting the rigid body.

In order to determine the inertia properties of the rigid body 2 the latter is suspended in elastic elements p in the form of wires, either directly (cf. FIG. 2) or via a rectangular platform 30 that serves as a support for the rigid body 2 (cf. FIG. 3). The number and arrangement of the suspension wires p can be freely chosen. Preferably, the wire stiffness $k_p$ should be low in order to ensure that the structure (rigid body) 2 has six rigid body mode shapes $X_j$ (i.e., there are no elastic deformations of the test object (rigid body)); moreover, the wire stiffness $k_p$ is preferably chosen to be constant (the force-displacement-relationship is linear) and damping should be light. The combination of soft metal coil springs with more or less rigid wires is one way to meet these requirements.

Figure 1:
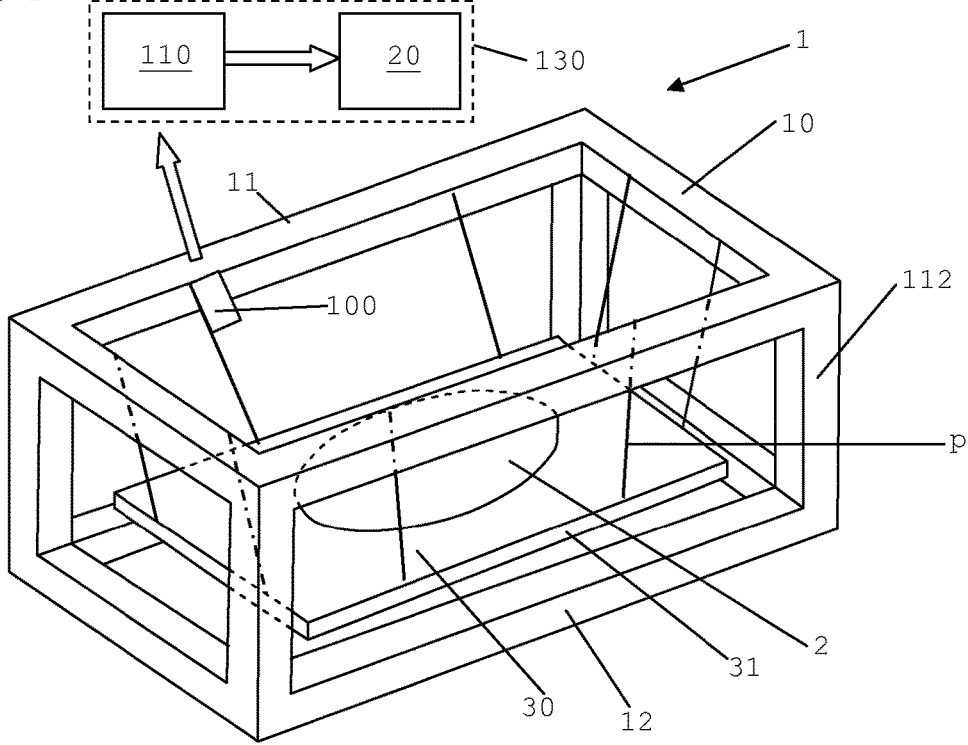
FIG. 1 shows in conjunction with FIGS. 2 to 6 a system 1 that is designed and provided for determining (estimating) the rigid body properties (inertia properties) of a mechanical structure (rigid body 2), which are defined by $$r = \{m, \zeta_G, \Theta\}, \quad (1)$$

According to FIG. 1, the rigid body 2 is suspended from a carrier 10 in the form of a hexahedral framework having an upper rectangular frame 11 connected to a lower rectangular frame 12 via four vertically extending legs 112 (related to a state of the carrier in which the latter is positioned as intended), wherein each leg 112 connects a corner of the lower frame 12 to an associated opposing corner of the upper frame 11.

For suspending the rigid body 2, a platform 30 for supporting the rigid body 2 is provided, wherein said plaform 30 is suspended from the carrier 10 by means of 8 elastic elements p, wherein each of the 8 elastic elements p is fixed with a free end to the upper frame and with an opposing free end to an edge 31 of the platform 30, such that elastic elements connected to the same edge 31 run preferably parallel with respect to each other.

After suspending the test object (rigid body) 2, preferably free vibrations of the six rigid body modes j are initiated in a random fashion, for example by pushing the structure 2 in an arbitrary direction. The motion (movement) of the rigid body 2 in the course of the resulting free vibration is measured about each of the six rigid body degrees of freedom (DOF)(or about a smaller number of degrees of freedom) by means of sensors 100 and a measuring device 110 connected thereto. In FIG. 1 all six sensors 100 are indicated as a square at one elastic element of the upper frame 11 (note that there are eight wires (elastic elements) p in FIG. 1 but only six sensors 100).

Figure 4:
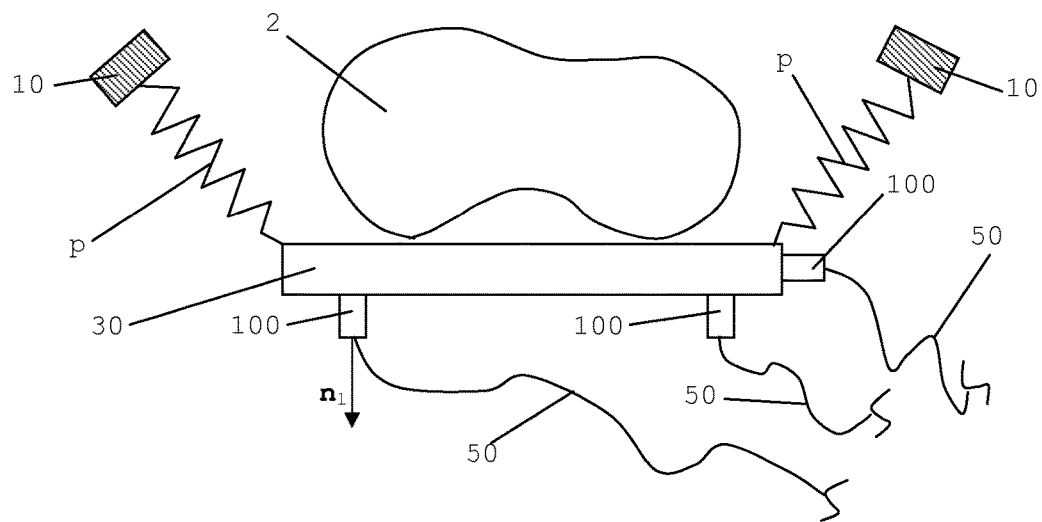
FIG. 4 shows a platform with sensors attached to it.
Figure 5:
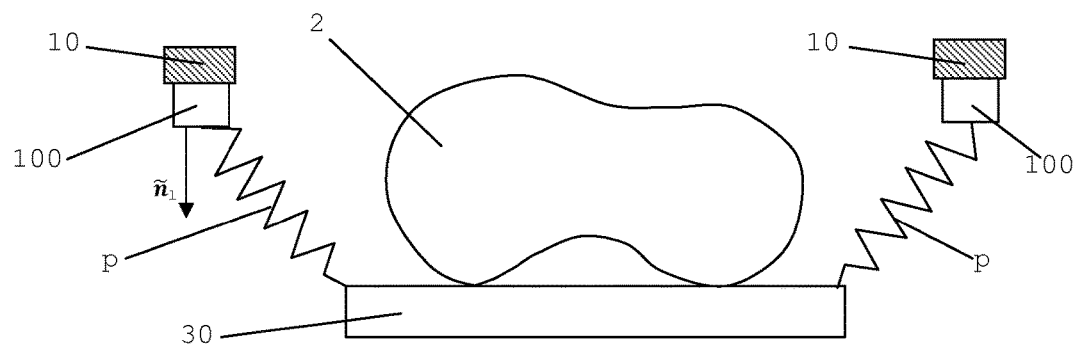
FIG. 5 shows a modification of the system according to FIG. 4, wherein the sensors are attached to the carrier.
Figure 6:
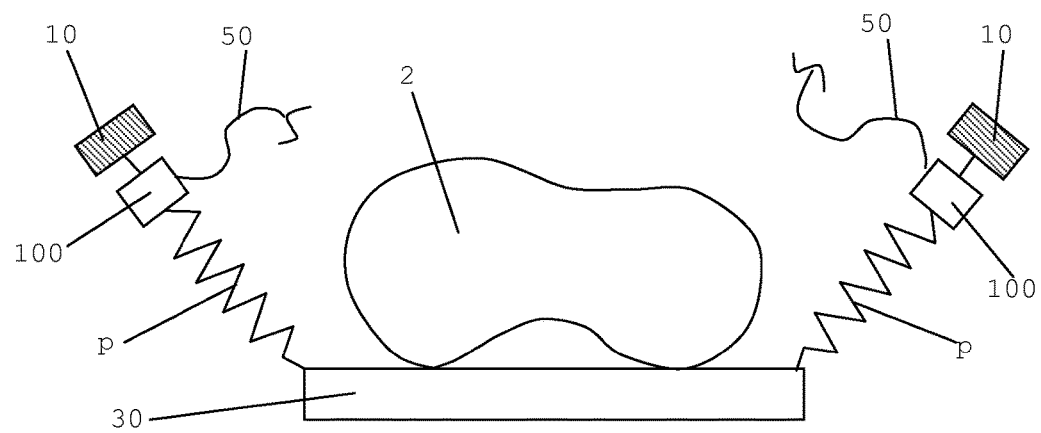
FIG. 6 shows a further modification of the system according to FIG. 4, wherein the sensors form part of the elastic elements used for suspending the rigid body.

Possible sensor arrangements are depicted in FIGS. 4 to 6. The measuring device 110 hands the measured movement (output signals) over to an analyzing means 20 that determines the desired inertia properties $r_S$ (cf. Equation (1)). Both the measuring device 110 and the analysing means 20 can be formed by a computer 130 on which a suitable software for measuring said movement and determining said rigid body properties $r_S$ is carried out.

In addition to the motion (free vibrations) of the rigid body 2, in particular only the following parameters need to be known in order to determine the rigid body properties $r_S$:
the number of suspension wires $N_p$,
the wire stiffness value $k_p$,
the lengths $l_p$ of the unloaded wires,
the attachment locations $\zeta_{a,p}$ on the structure (rigid body) 2,
the attachment locations $\zeta_{b,p}$ on the platform (support) 30,
the orientation $\tilde{n}_g$ of the field of gravity,
the rigid body properties $r_p$ of the platform (if used).

Note that none of these parameters changes over the lifetime of a system 1 of the type shown in FIG. 1.

Assuming now small displacements and negligible damping effects, the motion of a suspended rigid body 2 is defined by $$M\begin{bmatrix}\delta\ddot{x}\\\delta\ddot{\theta}\end{bmatrix}+K\begin{bmatrix}\delta x\\\delta\theta\end{bmatrix}=\begin{bmatrix}f\\t\end{bmatrix}, \qquad (3)$$

wherein $\delta x$ is a reference point displacement (3×1 vector), $\delta\theta$ is a rotation about the coordinate axes (3×1 vector), f is a translational force (3×1 vector), t is a moment of force (3×1 vector), M is the mass matrix (6×6 matrix), and K is the stiffness matrix (6×6 matrix).

Note that in case of large displacement amplitudes one may use instead of Equation (3) the complete non-linear equations of rigid body motion. In this case one may numerically integrate these Equations in order to derive a method equivalent to the harmonic approach presented below.

Both the mass matrix M and the suspension stiffness matrix K are functions of the unknown rigid body properties $r_S$. The mass matrix M of the rigid body 2 is now defined as $$M(r)=\begin{bmatrix}mI & -m[\zeta_G]_x\\ m[\zeta_G]_x & \Theta-m[\zeta_G]_x[\zeta_G]_x\end{bmatrix} \qquad (4)$$

wherein the notation $[\ ]_x$ used in Equation (4) transforms a cross product into a matrix vector multiplication $a\times b=[a]_x b$, where $$[a]_\times = \begin{bmatrix} 0 & -a_3 & a_2 \\ a_3 & 0 & -a_1 \\ -a_2 & a_1 & 0 \end{bmatrix}. \qquad (5)$$

In case a platform 30 is used, the overall mass matrix M is composed of the unknown rigid body properties of the test object 2, $r_S$, and the known rigid body properties of the platform $r_p$ $$M=M(r_S)+M(r_p) \qquad (6)$$

The stiffness matrix K depends on the unknown overall mass and center of gravity, $$m=m_S+m_P \qquad (7)$$

$$\zeta_G=\frac{1}{m}(m_S\zeta_{G,S}+m_P\zeta_{G,P}). \qquad (8)$$

The stiffness matrix K also depends on the static equilibrium position defined by the location $x_0$ and orientation $\theta$ of the space-fixed coordinate system spanned by $(\tilde{e}_1, \tilde{e}_2, \tilde{e}_3)$ relative to the body-fixed coordinate system spanned by $(e_1, e_2, e_3)$ (cf. FIG. 2). The parameters $x_0$ and $\theta$ are used to transform the space-fixed coordinates into body-fixed coordinates as follows, $$\zeta_{b,p}=x_0+R(\theta)^T\tilde{\zeta}_{b,p} \qquad (9)$$

$$n_g=R(\theta)^T\tilde{n}_g, \qquad (10)$$

where $R(\theta)$ is a rotational transformation matrix.

$$R(\theta)=\begin{bmatrix}1 & 0 & 0\\0 & \cos\theta_1 & \sin\theta_1\\0 & -\sin\theta_1 & \cos\theta_1\end{bmatrix}\begin{bmatrix}\cos\theta_2 & 0 & -\sin\theta_2\\0 & 1 & 0\\\sin\theta_2 & 0 & \cos\theta_2\end{bmatrix}\begin{bmatrix}\cos\theta_3 & \sin\theta_3 & 0\\-\sin\theta_3 & \cos\theta_3 & 0\\0 & 0 & 1\end{bmatrix} \qquad (11)$$

The static equilibrium position $(x_0,\theta)$ is not measured, but instead is obtained by minimizing the potential energy function $$V(x_0,\theta)=V_g+\sum_{p=1}^{N_p}V_{e,p}. \qquad (12)$$

In Equation (12), $V_{e,p}$ represents the elastic energy stored in a given elastic element (wire) p, $$V_{e,p}=\frac{1}{2}k_p(l_p-\|\zeta_{ba,p}\|)^2, \qquad (13)$$

where

-continued $$\zeta_{ba,p} = \zeta_{a,p} - \zeta_{b,p}. \quad (14)$$

The term $V_g$ in Equation (12) represents the gravitational energy of the rigid body 2 and is defined by the projection of the gravity force, $mgn_g$, onto the vector $x_O-\zeta_G$ that points from the center of gravity to the space-fixed origin O.

$$V_g = mg(x_{\bar{O}} - \zeta_G)^T n_g, \quad (15)$$

Once the static equilibrium position has been determined by minimizing Equation (12), the stiffness matrix K is obtained as follows $$K = -\sum_{p=1}^{N_p} T_p^T J_p T_p - \begin{bmatrix} 0 & 0 \\ 0 & mg[n_g]_\times [\zeta_G]_\times + \sum_{p=1}^{N_p} [f_p]_\times [\zeta_{a,p}]_\times \end{bmatrix}, \quad (16)$$

where $$J_p = -k_p \left(1 - \frac{l_p}{\|\zeta_{ba,p}\|}\right) I - k_p \frac{l_p}{\|\zeta_{ba,p}\|^3} \zeta_{ba,p} \zeta_{ba,p}^T \quad (17)$$

$$f_p = -k_p (\|\zeta_{ba,p}\| - l_p) \frac{\zeta_{ba,p}}{\|\zeta_{ba,p}\|}. \quad (18)$$

The stiffness matrix K defined by Equation (16) is special in that it accounts for all geometric stiffness effects caused by the gravity preload.

A softly suspended rigid body 2 always performs free vibrations with six different mode shapes $X_j$ and six natural frequencies $\omega_j$. The mode shapes $X_j$ and natural frequencies $\omega_j$ can be obtained by solving the following eigenvalue problem. (Note that moderate viscous damping does not affect the mode shapes and has only marginal effects on the natural frequencies. Therefore, damping does not need to be taken into account at this stage.)

$$0 = (-\omega_j^2 M + K) X_j, j=1, \ldots, 6 \quad (19)$$

The mode shapes $X_j$ should be normalized in a consistent way, e.g. in such a way that $$\|X_j\|=1.$$

In the next step, the mode shapes $X_j$ obtained from Equation (19) are transformed into the corresponding output $s_l$ obtained by a given sensor 100. In the following this transformation is stated for three different types of sensors 100 according to FIGS. 4 to 6. Note that in each case at least $N_1=6$ sensors must be used, when the rigid body performs vibrations along the six degrees of freedom (preferably, there must be as many sensors as degrees of freedom). According to FIG. 4, sensors 100 in the form of accelerometers are provided at different points on the platform 30 or the rigid body 2 itself. In case the orientation of the accelerometer 100 is defined by a unit vector $n_1$ and its position in body-fixed coordinates is given by $\zeta_1$ (cf. FIGS. 2 and 3), the relationship between the measurement acceleration $s_1^{(1)}$ and the rigid-body mode motion (movement) ($\delta x$, $\delta\theta$) is $$s_l^{(1)} = A_l^{(1)} \begin{pmatrix} \delta x \\ \delta\theta \end{pmatrix} \quad (20)$$

$$A_l^{(1)} = -\omega_j^2 [n_l^T \quad (\zeta_l \times n_l)^T]. \quad (21)$$

Accelerometers 100 have the disadvantage that the stiffness and intertia effects of their cable connections 50 to the measurement (measuring) device 110 (computer 130) can distort the measurements.

A second possibility according to FIG. 5 is the use of force sensors 100 placed between at least six of the elastic wires p and the carrier 10. For a sensor 100 pointing in a direction $\tilde{n}_1$ (in space-fixed coordinates), the relationship between the rigid body motion ($\delta x$, $\delta\theta$) and the sensor output $s_1^{(2)}$ is defined by $$s_l^{(2)} = A_l^{(2)} \begin{pmatrix} \delta x \\ \delta\theta \end{pmatrix} \quad (22)$$

$$A_l^{(2)} = \tilde{n}_l^T R(\theta) J_l(0) T_l. \quad (23)$$

The matrices $R(\theta)$, $J_1(0)$ and $T_1$ were already obtained as part of computing the stiffness matrix K.

The use of space-fixed force sensors 100 according to FIG. 5 eliminates the need for cable connections to moving parts in the system.

A third possibility according to FIG. 6 is to integrate a number of force sensors 100 into the upper part of the elastic elements (suspension wires) p. In this case, the following relationship defines the sensor output $S_1^{(3)}$ depending on the rigid body movement ($\delta x$, $\delta\theta$):

$$s_l^{(3)} = A_l^{(3)} \begin{pmatrix} \delta x \\ \delta\theta \end{pmatrix} \quad (24)$$

$$A_l^{(3)} = \frac{k_l}{\|\zeta_{ba,l}\|} \zeta_{ba,l}^T T_l. \quad (25)$$

Compared with sensors in the form of accelerometers, the motion amplitudes of this type of force sensor 100 is small, minimizing distortions caused by cables 50. Unlike both accelerometers 100 (FIG. 4) and space-fixed force sensors 100 (FIG. 5), force sensors 100 that are part of the elastic elements (suspension wires) p are always loaded in the same direction; as a result, errors due to cross-sensitivity can be avoided.

The free vibration signal measured by a given sensor 100 is defined by $$s_l(t_k) = A_l \sum_{j=1}^{6} X_j e^{-\zeta_j \omega_j t_k} (a_{2j-1} \sin(\omega_j t_k) + a_{2j} \cos(\omega_j t_k)) \quad (26)$$

where $\zeta_1$ is the damping ratio of the j-th rigid body mode. The factors $a_{2j-1}$ and $a_{2j}$ define the amplitude and the phase of a given mode and are the only parameters that depend on the random initial excitation.

Equation (26) defines the theoretical vibration signals of the rigid body 2. This expression can be fitted to the measured time-domain signals, $\check{s}_1(t_k)$, in order to identify the rigid body properties $r_s$. The resulting optimization problem is defined by $$\min_{\substack{r_s \in \mathbb{R}^{10} \\ \{a_j\} \in \mathbb{R}^{12} \\ \{\zeta_j\} \in \mathbb{R}^6}} \sum_{l=1}^{N_l} \sum_{k=1}^{N_k} \left(s_l(t_k) - \check{s}_l(t_k)\right)^2 \quad (27)$$

Note that the modal damping ratios $\zeta_1$ and the scaling factors $a_{2j-1}$ and $a_{2j}$ must be identified at the same time as the rigid body properties, even though these parameters may not be of interest to the experimenter.

Conventional nonlinear least-squares routines (e.g. the Gauss-Newton-Algorithms or the Leuvenberg-Marquardt Algorithms) can be used to solve the optimization problem Equation (27).

Preferably, all calculations in the course of the method according to the invention outlined above are performed by the analysing means 20, i.e., in particular by said computer 130 and said software carried out by said computer 130.

The invention claimed is:

1. A system for determining inertia properties of a rigid body, wherein the inertia properties comprise the mass, the location of the center of gravity, and the inertia tensor of the rigid body, the system comprising:
   a carrier,
   a plurality of elastic elements connected to the carrier for suspending the rigid body from the carrier via said elastic elements, wherein each elastic element comprises a spring and extends longitudinally along an associated extension direction,
   a platform that is designed for suspending the rigid body, wherein the platform is suspended from the carrier via said elastic elements in order to suspend the rigid body from the carrier, wherein each of the elastic elements is fixed with a free end to the carrier and with an opposing free end to an edge of the platform,
   wherein the carrier and the elastic elements are configured such that the rigid body is able to perform movements along all the six degrees of freedom of the rigid body corresponding to free vibrations along all the six degrees of freedom when the rigid body is suspended from the carrier via said elastic elements,
   a plurality of sensors providing output signals for detecting said free vibrations of the rigid body along all the six degrees of freedom of the rigid body, wherein the sensors are integrated into the elastic elements,
   a measuring device cooperating with the sensors, wherein the measuring device is configured to measure said free vibrations of the rigid body along all the six degrees of freedom by means of said output signals ($\check{s}_1(t_k)$),
   an analysing means configured for determining from said output signals ($\check{s}_1(t_k)$) said inertia properties of the rigid body, wherein
   the analysing means is configured to fit the function $$s_l(t_k) = A_l \sum_{j=1}^{6} X_j e^{-\zeta_j \omega_j t_k} (a_{2j-1} \sin(\omega_j t_k) + a_{2j} \cos(\omega_j t_k)),$$

to said measured output signals ($\check{s}_1(t_k)$) in order to determine said inertia properties, and wherein the analysing means (20) is further configured to use the following parameters provided as input quantities to determine said inertia properties of said rigid body:
   the number ($N_p$) of the elastic elements,
   the stiffness value of the elastic elements ($k_p$),
   the lengths ($l_p$) of the unloaded elastic elements,
   the attachment locations ($\zeta_{a,p}$) of the elastic elements on the carrier,
   the attachment locations ($\tilde{\zeta}_{b,p}$) of the elastic elements on the platform, when the rigid body is arranged on a platform,
   the orientation of the field of gravity ($\tilde{n}_g$).

2. The system according to claim 1, wherein the measuring device is configured to measure output signals ($\check{s}_1(t_k)$) corresponding to the translation of the rigid body along the three orthogonal axes and the rotations about these axes as a function of time ($t_k$).

3. The system according to claim 1, wherein the analysing means is configured to determine said inertia properties ($r_S$) by minimizing the expression $$\sum_{l=1}^{N_l} \sum_{k=1}^{N_k} \left(s_l(t_k) - \check{s}_l(t_k)\right)^2$$

with respect to $r_S \in \mathbb{R}^{10}$, $\{a_j\} \in \mathbb{R}^{12}$, $\{\zeta_j\} \in \mathbb{R}^6$, wherein the analysing means is configured to conduct said minimisation by means of a non-linear least-squares method.

4. The system according to claim 1, wherein said carrier is designed as a hexahedral framework.

5. A method for determining inertia properties of a rigid body, the method comprising the steps of:
   arranging the rigid body on a platform and suspending the platform from a carrier via elastic elements, wherein each elastic element comprises a spring and extends longitudinally along an associated extension direction, wherein each of the elastic elements is fixed with a free end to the carrier and with an opposing free end to an edge of the platform,
   causing the rigid body to perform movements along all six degrees of freedom of the rigid body in the form of free vibrations,
   measuring output signals ($\check{s}_1(t_k)$) corresponding to said free vibrations of the rigid body by means of sensors that are integrated into the elastic elements,
   and
   determining said inertia properties from the said output signals ($\check{s}_1(t_k)$) automatically by means of an analyzing means (20),
   wherein the analyzing means (20) is configured to fit the function $$s_l(t_k) = A_l \sum_{j=1}^{6} X_j e^{-\zeta_j \omega_j t_k} (a_{2j-1} \sin(\omega_j t_k) + a_{2j} \cos(\omega_j t_k)),$$

to said measured output signals ($\check{s}_1(t_k)$) in order to determine said inertia properties, and wherein the analysing means (20) further uses the following parameters provided as input quantities to determine said inertia properties of said rigid body:
   the number ($N_p$) of the elastic elements,
   the stiffness value of the elastic elements ($k_p$),
   the lengths ($l_p$) of the unloaded elastic elements, the attachment locations ($\zeta_{a,p}$) of the elastic elements on the carrier, the attachment locations ($\tilde{\zeta}_{b,p}$) of the elastic elements on the platform, the orientation of the field of gravity ($\tilde{n}_g$).

6. The method according to claim 5, wherein said inertia properties are automatically determined by minimizing the expression $$\sum_{l=1}^{N_l} \sum_{k=1}^{N_k} \left( s_l(t_k) - \check{s}_l(t_k) \right)^2$$

with respect to $r_S \in \mathbb{R}^{10}$, $\{a_j\} \in \mathbb{R}^{12}$, $\{\zeta_j\} \in \mathbb{R}^{6}$, wherein said minimisation is automatically conducted by means of a non-linear least-squares method.

* * * * *